United States Patent [19]

Nishibe et al.

[11] Patent Number: 4,916,307

[45] Date of Patent: Apr. 10, 1990

[54] LIGHT INTENSITY DETECTING CIRCUIT WITH DARK CURRENT COMPENSATION

[75] Inventors: Takashi Nishibe; Shotaro Yokoyama, both of Kanagawa, Japan

[73] Assignee: Fuji Electric Co., Ltd., Kanagawa, Japan

[21] Appl. No.: 282,813

[22] Filed: Dec. 12, 1988

[30] Foreign Application Priority Data

Dec. 15, 1987 [JP] Japan ................... 62-315306
Jun. 2, 1988 [JP] Japan ................... 63-136596

[51] Int. Cl.$^4$ ............................................. H01J 40/14
[52] U.S. Cl. ............................ 250/214 C; 358/213.16
[58] Field of Search .............. 250/214 R, 214 C, 578, 250/211 J; 358/213.16

[56] References Cited

U.S. PATENT DOCUMENTS 4,659,930 4/1987 Johnson et al. ............ 250/214 C
4,819,071 4/1989 Nakamura .................. 358/213.16

Primary Examiner—David C. Nelms
Attorney, Agent, or Firm—Finnegan, Henderson, Farabow, Garrett and Dunner

[57] ABSTRACT

A light intensity detecting circuit using a charge storage type of optical sensor having a parallel capacitor eliminates the influence of the dark current of the optical sensor and/or the influence of the offset of the comparator included in the detecting circuit so that the accuracy of the light intensity detection is improved over that of the prior art. To eliminate the influence of the dark current of the optical sensor in an image sensor, there is provided an optically shielded mimic sensor having the same structure as that of the optical sensor including a corresponding parallel capacitor. In order to eliminate the influence of the offset of the comparator, there is provided a time constant circuit having a capacitor that may be composed partially of the parallel capacitor of the mimic sensor corresponding to the parallel capacitor of the optical sensor; with potential applying means for operating the time constant circuit.

6 Claims, 5 Drawing Sheets

LIGHT INTENSITY DETECTING CIRCUIT WITH DARK CURRENT COMPENSATION

BACKGROUND OF THE INVENTION

1. Field of the Invention

The present invention relates to a circuit using an optical sensor of the charge storage type, which is equipped with a parallel capacitor, for detecting the intensity of light received by the optical sensor in the form of a time signal and, more particularly, to a light intensity detecting circuit suited for accurately detecting the intensity of light received by each of the optical sensors contained in an image sensor.

2. Description of the Prior Art

In order to detect the intensity of light, the prior art has used either an optical sensor with a variety of photoconductive elements such as phototransistors or photodiodes or an image sensor having the optical sensors integrated. As is well known in the art, the intensity of light to be received by the optical sensor can vary over a very wide range, for example a ratio of 1 to $10^6$. The output voltage or current obtained from a simple photoelectric element cannot indicate such a widely varying optical intensity. In accordance with the prior art as illustrated in FIG. 7, therefore, an optical sensor of the charge storage type, 11 and 12, is employed. A parallel capacitor 12 acting as a kind of integration element is charged or discharged by a photocurrent proportional to the optical intensity coming from the optical sensor 11 so that the light intensity may be expressed by the time period for which the terminal voltage of the capacitor changes a predetermined amount.

The capacitor 12 to be connected in parallel with the optical sensor 11 may ordinarily have a small capacity, which is frequently exemplified by a stray capacity accompanying the photoelectric element or the junction capacity of its semiconductor junction.

A photodiode may be employed as the optical sensor 11 and, together with parallel capacitor 12 acting as the diode junction capacity, constitutes one charge storage type optical sensor within an image sensor 10. The light sensors 11 in the image sensor 10 each have first terminals connected commonly to receive a fixed potential Vd and second terminals connected with one input of a comparator 2 in a detecting circuit 1 provided for each optical sensor. The one input of the comparator 2 is further connected through a transistor 3 with a first potential V1. The other, or second, input of the comparator 2 is supplied with a second potential V2 as a comparative reference potential and delivers an output signal S. The first potential V1 is most simply exemplified by the ground potential, and the second potential V2 is exemplified by a potential between the ground potential and the fixed potential Vd.

FIG. 8 illustrates the operation of the prior art detecting circuit 1. In order to cause this circuit to start the detecting operation, as shown at (a) in FIG. 8, a reset pulse R is fed to render the transistor 3 conductive so that the potential v of the first input of the comparator 2 is set at the first potential V1, as shown at (b) in FIG. 8. At this time, the parallel capacitor 12 of the photodiode 11 is charged with a voltage between the fixed potential Vd and the first potential V1, and the detecting circuit 1 is subjected to the so-called "initialization" so that a detection signal S or the output of the comparator 2 is reset from "H" to "L", as shown at (c) in FIG. 8. Then, the capacitor 12 is discharged by the photocurrent based on the light L received by the photodiode 11 so that the potential v at the first input of the comparator 2 gradually rises, as shown at (b) in FIG. 8. As easily seen, the gradient or rate of this rise is proportional to the intensity of the light received by the photodiode 11.

When the potential v rises to the second potential V2, the detection signal S from the comparator 2 has its state switched from "L" to "H", as shown at the right of (c) in FIG. 8. The time period Td, for which the detection signal S is at the level "L" after extinction of the reset pulse R, indicates the intensity of light received by the photodiode 11. This time period Td expressed by the detection signal S is naturally inversely proportional to the light intensity, but this inverse proportion need not be elaborately corrected to a strictly proportional relation. The detection signal S is usually used, as it is, as the signal indicating the light intensity.

The light intensity detecting circuit according to the prior art can measure or detect the light intensity accurately on principle in terms of the length of the time period indicated by the detection signal of the optical sensor even if the intensity of light received by the optical sensor varies over a very wide range, as described above.

Despite this advantage, however, the light intensity detecting circuit of the prior art has the disadvantage that a high detection accuracy, even if demanded, is restricted by a few factors. One of these restricting factors is the dark current of the optical sensor. In most of the optical sensors, as is well known in the art, a kind of leakage current known as the dark current will flow even if no light is received. The charge storage type of optical sensor is especially liable to have its detection accuracy deteriorated in the range of low light intensity. In the example of FIG. 7, the parallel capacitor 12 is excessively discharged by the dark current during the time period for the light detection such that the detection time period expressed by the detection signal S is shortened accordingly.

This behavior due to the dark current is illustrated in FIG. 9. The broken line in FIG. 9 indicates the rise of the potential v when there is no dark current. The point of intersection of this broken line with the second potential V2 indicates the time period Tr, which in turn indicates the true detection time period expressing the intensity of light actually received by the photodiode 11. Due to the presence of the dark current, however, the rise of the potential v follows the solid line, as shown in FIG. 9, which determines the detection time period Td by its point of intersection with the second potential. This detection time period Td is always slightly shorter than the true detection time period Tr, and the difference leads to the detection error. The value of the dark current is naturally very small, for example 0.5 to 0.6 pA at most, in the case in which the optical sensor is a photodiode. However, the error cannot be neglected, as will be easily understood, if the light intensity is so weak that the detection time period is elongated.

Another restricting factor of the prior art light intensity detecting circuit is an error or offset in the operation of the comparator. In the example of FIG. 7, the comparator 2 must operate to change its output state when the value of the potential v becomes exactly equal to the second potential V2 acting as the comparative reference potential. As a practical matter, however, the comparator 2 has an operating potential, which fluctuates within the range of high and low offsets of the comparative reference potential. These offsets are usually small, within ±1% or less of the comparative reference potential and about ±0.01 V in voltage. Even in this usual case, however, the error cannot be ignored for a long detection time period. FIG. 9 shows the effect of the operational offsets of the comparator 2 which are indicated by ΔV. As shown, the detection time period Td expressed by the detection signal S may fluctuate between the minimum Tn and the maximum Tx by the offsets.

SUMMARY OF THE INVENTION

An object of the present invention is to solve the foregoing problems in the prior art.

Another object of the present invention is to provide a light intensity detecting circuit which can detect a wide range of intensities accurately.

Another object of the first example of the present invention is to prevent a detection signal time period expressed by a detection signal of a light intensity detecting circuit from being influenced by dark current in order to improve the detection accuracy of the light intensity detecting circuit.

Another object of the second example of the present invention is to prevent the influences due to the offsets of a comparator in a light intensity detecting circuit in order to improve the detection accuracy of the light intensity detecting circuit.

Another object of the embodiment of the present invention combining the principles of the first and second examples is to prevent a detection signal time period expressed by a detection signal of a light intensity detecting circuit from being influenced by dark current and the offsets of a comparator in the light intensity detecting circuit in order to improve the light detection accuracy.

In order to attain the above objects of the first example, the present invention provides a received light intensity detecting circuit with an optical sensor having first and second terminals and a parallel capacitor and being connected at the first terminal with a predetermined potential, first potential applying means connected between the second terminal of the optical sensor and a source of a first potential and rendered conductive at an initial setting, and a comparator having a first input terminal connected to the second terminal of the optical sensor and a second input terminal receiving a comparative reference potential of a level between the predetermined potential and the first potential such that the intensity of received light is detected as the time period between the initial setting and the instant when an output signal is generated from the comparator, comprising an optically shielded mimic sensor having a first terminal connected to the predetermined potential and a second terminal connected to the second input terminal of the comparator and having the same structure as that of the optical sensor including a corresponding parallel capacitor; a source of a second potential having a level between the predetermined potential and the first potential; and second potential applying means connected between the second potential source and the second terminal of the mimic sensor and being rendered conductive only at the initial setting.

In order to attain the objects of the second example, the present invention provides a received light intensity detecting circuit with an optical sensor having first and second terminals and a parallel capacitor and being connected at the first terminal with a predetermined potential, first potential applying means connected between the second terminal of the optical sensor and a source of a first potential and rendered conductive at an initial setting, and a comparator having a first input terminal connected to the second terminal of the optical sensor and a second input terminal receiving a comparative reference potential of a level between the predetermined potential and the first potential such that the intensity of received light is detected as the time period between the initial setting and the instant when an output signal is generated from the comparator, comprising a time constant circuit including a capacitor having a first terminal connected to the predetermined potential and a second terminal connected to the second input terminal of the comparator; second potential applying means for applying a second potential of a level between the predetermined potential and the first potential to the first input terminal of the comparator prior to the initial setting; third potential applying means for operating the time constant circuit for raising the second terminal of the capacitor of the time constant circuit to a third potential having a level between the predetermined potential and the second potential while the second potential is being applied by the second potential applying means to the first input terminal of the comparator and interruption means for interrupting the operation of the time constant circuit in response to the generation of the output signal of the comparator.

In order to attain all the above and other objects, the present invention provides a received light intensity detecting circuit with an optical sensor having first and second terminals and a parallel capacitor and being connected at the first terminal with a predetermined potential, first potential applying means connected between the second terminal of the optical sensor and a source of a first potential and rendered conductive at an initial setting, and a comparator having a first input terminal connected to the second terminal of the optical sensor and a second input terminal receiving a comparative reference potential of a level between the predetermined potential and the first potential such that the intensity of received light is detected as the time period between the initial setting and the instant when an output signal is generated from the comparator, comprising an optically shielded mimic sensor having a first terminal connected to the predetermined potential and a second terminal connected to the second input terminal of the comparator and having the same structure as that of the optical sensor including a corresponding parallel capacitor; a time constant circuit including the parallel capacitor of the mimic sensor corresponding to the parallel capacitor of the optical sensor; second potential applying means for applying a second potential of a level between the predetermined potential and the first potential to the first input terminal of the comparator prior to the initial setting; third potential applying means for operating the time constant circuit for raising the second sensor input terminal of the mimic sensor to a third potential having a level between the predetermined potential and the second potential while the second potential is being applied by the second potential applying means to the first input terminal of the comparator; and interruption means for interrupting the operation of the time constant circuit in response to the generation of the output signal of the comparator.

BRIEF DESCRIPTION OF THE DRAWINGS

The manner by which the above and other objects are attained will be fully apparent from the following detailed description when considered with reference to the accompanying drawings, in which.

DETAILED DESCRIPTION OF THE PREFERRED EMBODIMENT

Figure 1:
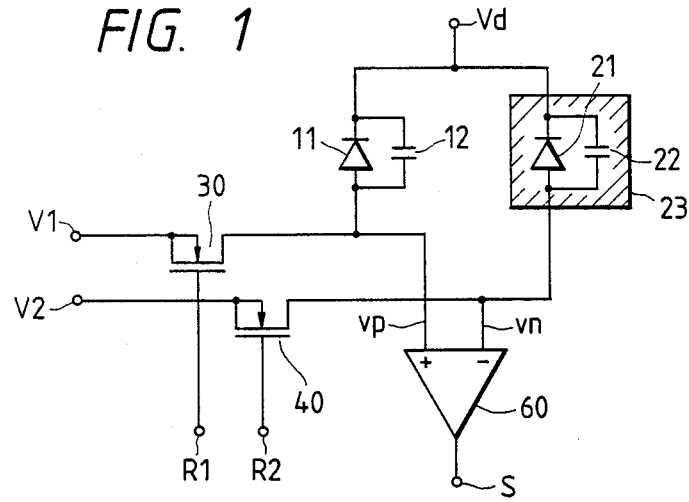
FIG. 1 is a circuit diagram showing, by way of example, the light intensity detecting circuit according to the present invention having the dark current compensating function.

The structure and operation of the present invention will be described with reference to the accompanying drawings. FIG. 1 is a circuit diagram showing the light intensity detecting circuit in accordance with the present invention having the dark current compensating function, and FIG. 2 is a waveform chart showing the operation of the light intensity detecting circuit of FIG. 1.

In FIG. 1, an optical sensor 11 is a photodiode, as shown, with its junction capacity used as a parallel capacitor 12. A mimic sensor 21 is equipped with a similar parallel capacitor 22 having the same construction but is different from the optical sensor in that it is optically shielded with a shielding film 23 of aluminum. In case a plurality of optical sensors 11 are disposed in an image sensor, the mimic sensor 21 may be shared commonly among the plural optical sensors. The optical sensor 11 and the mimic sensor 21 have their first or upper terminals fixed at a common potential Vd.

A potential vp at the other (or second) terminal of the optical sensor 11 and a potential vn at the other (or second) terminal of the mimic sensor 21 are fed to first and second inputs of a comparator 60, respectively. As shown, the first and second inputs are the positive and negative inputs of the comparator. Connected to the second terminal of the optical sensor 11, is a transistor 30 which acts as potential applying means for initially setting the second terminal of the optical sensor 11 at a first potential V1. Connected to the second terminal of the mimic sensor 21, is a transistor 40 that acts as another potential applying means for initially setting the comparative reference potential of the comparator 60 at a second potential V2.

Figure 2:
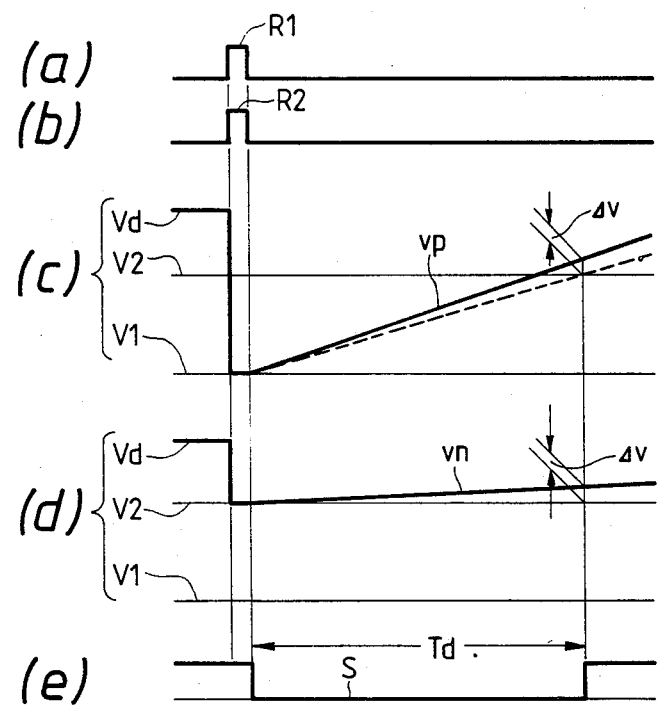
FIG. 2 is a waveform chart showing the operation of the light intensity detecting circuit of FIG. 1 according to the present invention.

In order to cause the light intensity detecting circuit thus constructed to start its operation, reset pulses R1 and R2 are applied to the transistors 30 and 40 acting as the potential applying means, respectively, so that the potential vp at the second terminal of the optical sensor 11 and the potential vn at the second terminal of the mimic sensor 20 are initially set at the first potential V1, as shown at (c) in FIG. 2, and the second potential V2, as shown at (d) in FIG. 2, respectively. The potential vn at the second terminal of the mimic sensor 21 is the comparative reference potential, which is applied to the negative input of the comparator 60, as has been described. The potential vn rises with a very gentle gradient, as shown at (d) in FIG. 2, in accordance with the level of the dark current of the mimic sensor after it has been initially set at the second potential V2. On the other hand, the potential vp at the second terminal of the optical sensor 11 is the potential that is applied to the positive input of the comparator 60 so that it is compared with the comparative reference potential vn. The potential vp rises, as shown at (c) in FIG. 2, with a gradient according to the sum of the photocurrent of the light received by the optical sensor and the dark current after it has been initially set at the first potential V1.

Figure 7:
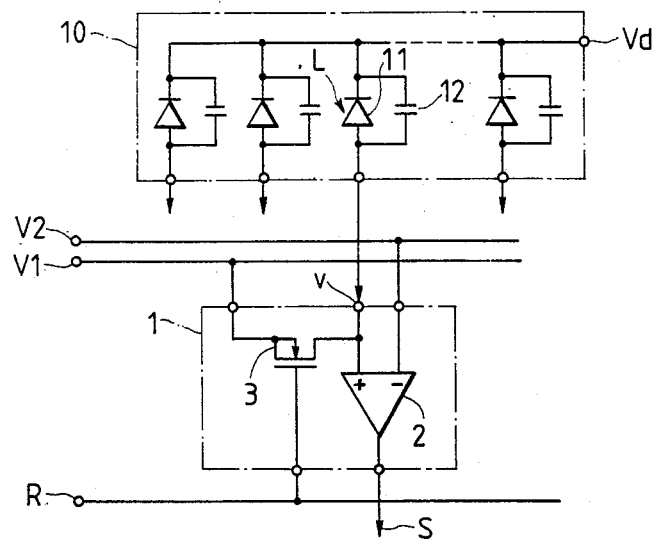
FIG. 7 is a circuit diagram showing the light intensity detecting circuit of the prior art by way of example.
Figure 8:
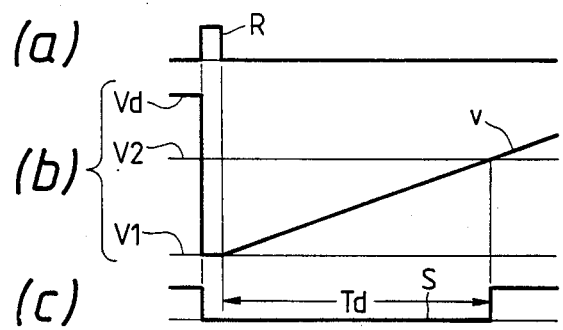
FIG. 8 is a waveform chart showing the operation of the prior art light intensity detecting circuit of FIG. 7.
Figure 9:
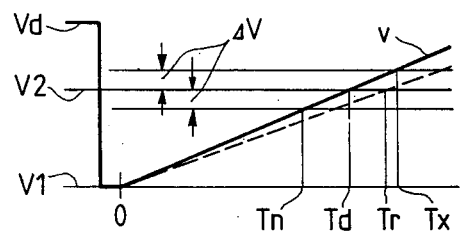
FIG. 9 is a waveform chart showing the causes for the occurrence of a detection error in the prior art circuit of FIG. 7.

In the circuit of the prior art previously discussed with reference to FIG. 7, the comparator circuit 60 changes its output state when the potential v to be compared, corresponding to the potential vp of the present invention, rises to the second potential V2. In contrast, in the case of the present invention, the comparative reference potential vn varies with time. As a result, the output S of the comparator 60 of the present invention does not change its state from "L" to "H" before the potential vp exceeds the second potential V2 by the rise of the potential vn, as indicated at Δv in FIG. 2. If the dark current of the mimic sensor 21 is equal to that of the optical sensor 11, the instant for the change in the output state of the comparator 60 must correspond to the point of intersection between the rise of the potential based upon only the photocurrent of the optical sensor 11, as indicated by the broken curve at (c) in FIG. 2, and the second potential V2. In other words, the comparative reference potential vn is raised with time by the dark current of the mimic sensor having the same structure as that of the optical sensor so that the dark current component of the optical sensor can be compensated to change the output state of the comparator 60 at the same timing as that based upon the pure photocurrent. For this reason, the present invention compensates for the dark current.

The output S of the comparator 60 is naturally set from "H" to "L" at first when the optical sensor and mimic sensor are set at the first and second potentials, respectively. As shown at (e) in FIG. 2, therefore, the time period Td, for which the output S is in the state "L" after extinction of the reset pulses R1 and R2, is the detection time period indicating the intensity of light received by the optical sensor, and the output S is used as the output signal of the light intensity detecting circuit. The value of the dark current is a function of the voltage applied to the optical sensor and the mimic sensor so that these two sensors do not have absolutely the same operating state although they have the same structure. Strictly speaking, the result is that the dark current values of the two sensors will become different.

In order to raise the light detecting sensitivity of the light intensity detecting circuit in its actual operating state, however, the difference between the first potential V1 and the second potential V2 is set at a much lesser value than the difference between them and the fixed potential Vd. As a result, the voltages to be applied to the two sensors are at substantially the same level, and the dark current values may be considered the same. At (c) in FIG. 2, the difference between the first potential and the second potential is greatly exaggerated for the convenience of illustration.

Figure 3:
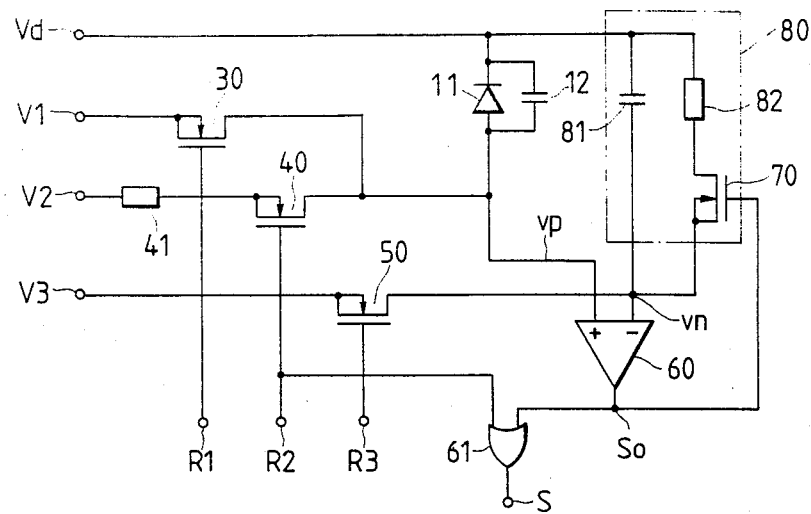
FIG. 3 is a circuit diagram showing, by way of example, the light intensity detecting circuit according to the present invention having the offset-compensating function for the comparator.
Figure 4:
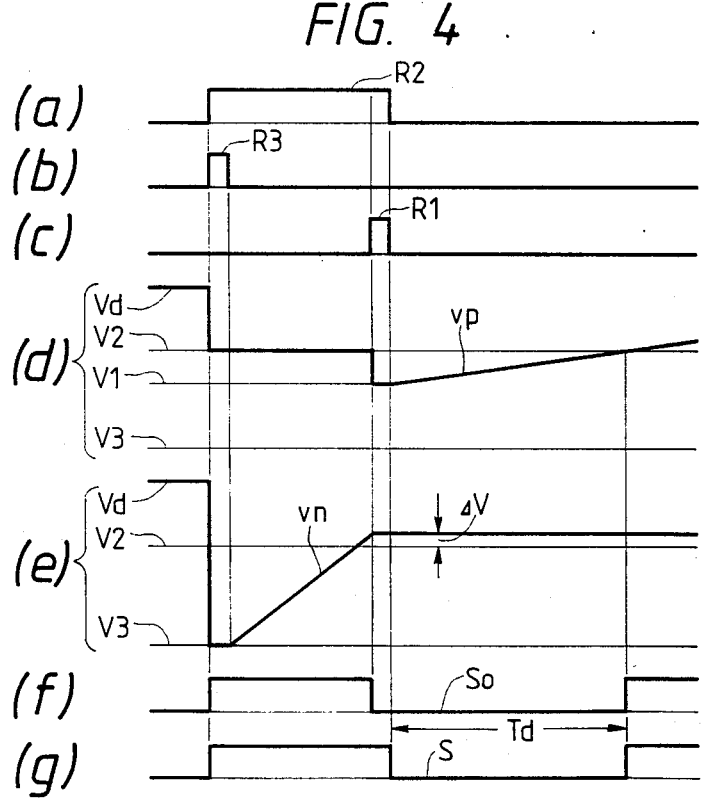
FIG. 4 is a waveform chart showing the operation of the light intensity detecting circuit of FIG. 3 according to the present invention.

FIG. 3 is a circuit diagram showing a light intensity detecting circuit in accordance with the present invention having a function to compensate for the offsets of the comparator, and FIG. 4 is a waveform chart illustrating the operation of the light intensity detecting circuit of FIG. 3.

In FIG. 3, the optical sensor 11 and the parallel capacitor 12 are the same as described with reference to FIG. 1, but the mimic sensor is replaced by a time constant circuit 80 which is composed of a capacitor 81 and a resistor 82. In the example illustrated, the time constant circuit 80 is equipped with interruption means 70 for interrupting the operation of the time constant circuit. This interruption means 70 may be embodied as a transistor that is connected in series with the resistor 82. Like the foregoing example, the optical sensor 11 and the time constant circuit 80 have their first terminals fixed at the common potential Vd and the potential vp at the other (or second) terminal of the optical sensor 11 and the potential vn at the other (or second) terminal of the time constant circuit 80 are fed to the positive and negative inputs of the comparator circuit 60, respectively. Unlike the foregoing example of FIG. 1, however, the second terminal of the optical sensor 11 is connected with a transistor 30 acting as the means for applying the first potential V1 thereto and a transistor 40 acting as the means for applying the second potential V2 thereto. The second terminal of the time constant circuit 80 is connected with a transistor 50 acting as means for applying the third potential V3 thereto.

The transistor 70 acting as the interruption means receives the output So of the comparator 60. The output signal S of the light intensity detecting circuit is extracted from the output of an OR gate 61 which receives the output So of the comparator and the set command R2 of the transistor 40.

In order to operate this light intensity detecting circuit, the set command R2, as shown at (a) in FIG. 4, is fed to the transistor 40 to fix the second terminal of the optical sensor at the second potential V2, as shown at (d) in FIG. 4. Simultaneously with this, in the preset example, a reset pulse R3, as shown at (b) in FIG. 4, is fed to the transistor 50 to initially set or usually set the second terminal of the time constant circuit 80 at a third potential V3, as shown at (e) in FIG. 4. As a result, the output So of the comparator 60 takes the level "H", which turns on the transistor 70 acting as the interruption means to bring the time constant circuit 80 into its operating state.

As a result, the potential vn at the second terminal of the time constant circuit 80 rises, as shown at (e) in FIG. 4. In response to the potential vn, the comparator 60 should ideally change the state of output So when the potential vn reaches the second potential V2 fed to the positive input of the comparator 60. Because of the offset $\Delta V$, the comparator 60 changes the state of its output So from "H" to "L" when the potential vn at the second terminal of the time constant circuit 80 reaches a value that is higher than the second potential V2 by that offset $\Delta V$. In response to the signal So, the transistor 70 acting as the interruption means is turned off so that the operations of the time constant circuit 80 are interrupted at the time when So changes from "H" to "L". After this, the potential vn at the second terminal of the time constant circuit 80 is fixed at a potential that is shifted by the offset $\Delta V$ of the comparator 60 from the second potential V2, as shown at (e) in FIG. 4.

As can be understood from the above description, the second potential V2 corrected with an amount equal to the offset value $\Delta V$ due to the comparator 60 is so-called "stored" in the form of the potential at the second terminal of the time constant circuit. After this, the intensity of light received by the optical sensor is detected by the use of the second potential, which is compensated with the offset.

Upon detection, the potential vp at the second terminal of the optical sensor is switched from the second potential V2 to the first potential V1 and set at the first potential V1. For this purpose and in response to the change of the output So of the comparator 60 from "H" to "L", the set command R2 for the second potential is switched from "H" to "L", as shown at (a) in FIG. 4, so that the reset pulse R11 is applied, as shown at (d) in FIG. 4, to the transistor 30 acting as the first potential applying means. The resistor 41 inserted in series with the transistor 40 prevents the first potential and the second potential from being shorted within a short time period for which the set command R2 and the reset pulse R1 are overlapped.

By the operations described above, the potential vp at the other terminal of the optical sensor 11 is set at the first potential V1, as shown at (d) in FIG. 4, and then rises with a gradient according to the intensity of light received by the optical sensor. The comparator 60 receiving the value of the potential vp from that optical sensor 11 at its positive input compares the value of the potential vp with the offset-compensated second potential V2 it receives at its negative input. Since comparator 60 has already received the offset-compensated second potential V2 at its negative input, it changes the state of its output So from "L" to "H", as shown at (f) in FIG. 4, irrespective of the offset value when the potential vp at the second terminal of the optical sensor 11 accurately reaches the second potential V2.

The OR gate 61 receives the output So at its first input and the set command R2 at its second input, in this example, so that its output signal S takes the state of "L", as shown at (g) in FIG. 4, for the time period Td from the instant when the potential vp at the second terminal of the optical sensor 11 is set at the first potential V1 to the instant when the state of the output So of the comparator 60 changes. As a result, the output of the OR gate 61 is used, in this example, as the output signal indicating the detection result of the light intensity detecting circuit. The detection time period Td indicates the intensity of light received by the optical sensor.

As can be understood from the above description, the light intensity detecting circuit has its operations divided into two stages. In the first stage, the second potential is offset-compensated and stored in the time constant circuit. In the second stage this offset-compensated second potential is used as the comparative reference potential of the comparator to detect the intensity of light received by the optical sensor. As a result, the light intensity detecting circuit according to the present invention can always detect the light intensity accurately without being influenced by the offset due to the comparator.

One embodiment of the present invention will be described in the following with reference to FIGS. 5 and 6. In this embodiment, the time constant circuit and the mimic sensor are both used so that the invention is provided with the dark current compensating function of the optical sensor and the offset compensating function of the comparator.

Figure 5:
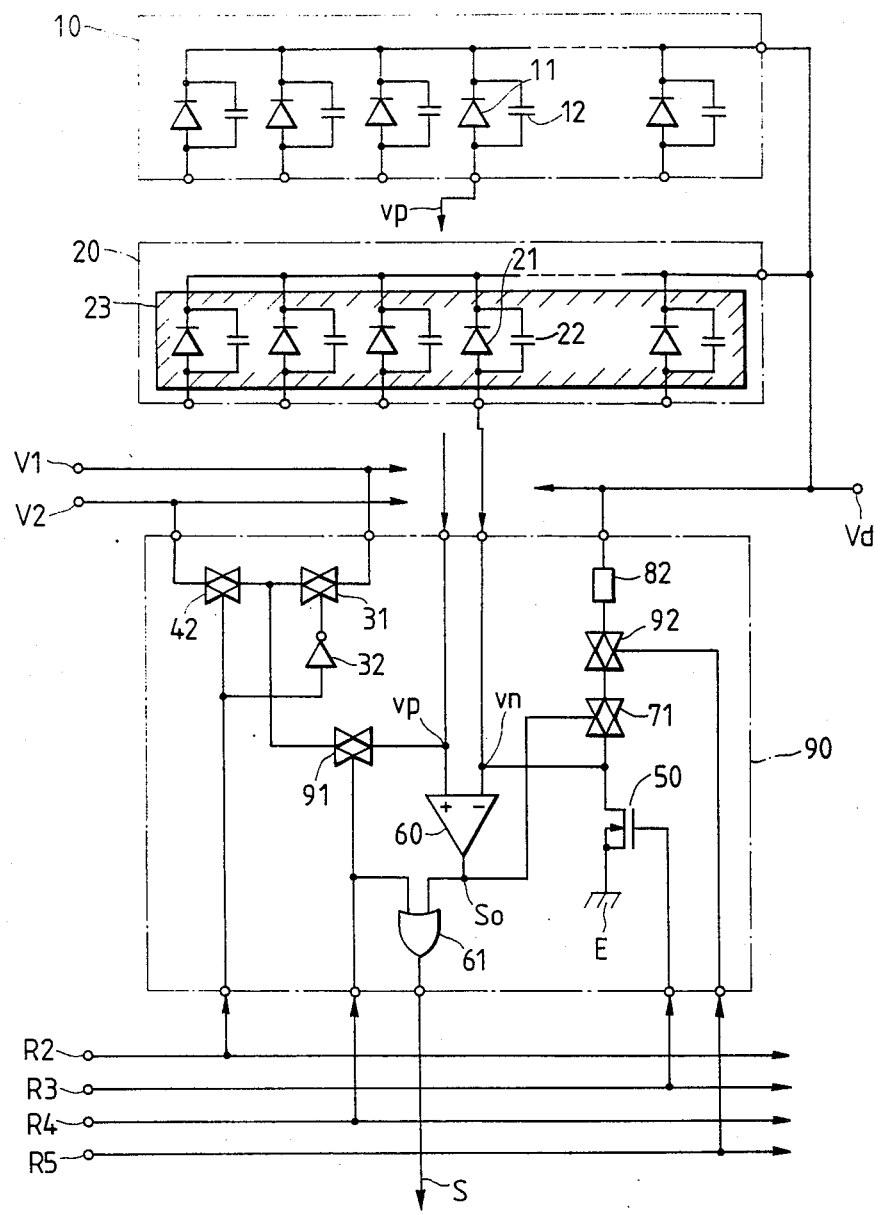
FIG. 5 is a circuit diagram showing another embodiment of the present invention.

In FIG. 5, the optical sensors 11 are exemplified by photodiodes, which are contained in the image sensor 10 shown in the upper portion of the drawings, and have their junction capacities used as the parallel capacitors 12, as usual. In a mimic image sensor 20 shown below the image sensor 10, a mimic sensor 21 is disposed for each of the optical sensors 11 and is covered with the shielding film 23 so that the parallel capacitor 22 acting as the junction capacity is also used as the capacitor of the time constant circuit. All the optical sensors 11 and the mimic sensors 21 have their first terminals connected commonly and fixed at the constant potential Vd. Moreover, a detector 90 located below the mimic image sensor 20 is provided for each pair of the optical sensor 11 and the mimic sensor 21 and receives the fixed potential Vd, the first potential V1 and the second potential V2 shared among all the detectors. As the third potential, there is used in this embodiment the ground potential E which is located in the block of the detector 90. In this embodiment, as seen from the drawing, the potential applying means in the detector 90 is exemplified mainly by transmission gates in place of the transistors of the foregoing example.

The potential vp at the second terminal of the optical sensor 11 and the potential vn at the second terminal of the mimic sensor 21 are applied to the positive and negative inputs of the comparator 60 in the detector 90, respectively. In this embodiment, the potential vp from the optical sensor 11 is fixed or set at the first potential V1 or the second potential V2. The positive input circuit located at the lefthand side of the comparator 60 is equipped with a transmission gate 31 acting as means for applying the first potential V1 and a transmission gate 42 acting as means for applying the second potential V2. In this embodiment, moreover, another transmission gate 91 is provided as a potential applying means, which is shared between the first and second potentials. This transmission gate 91 is connected between the node of the transmission gates 31 and 42 and the positive input of the comparator 60.

The transmission gate 42 for the second potential V2 is controlled by the set command R2. In this embodiment, the transmission gate 31 for the first potential V21 is also controlled by making use of the same set command R2. Thus, the set command R2 is fed through an inverter 32 to the transmission gate 31. The transmission gate 91 shared between the first and second potentials is used to start the so-called "detecting operation" and is fed with a detection command R4 for its control. In this embodiment, the detection command R4 and the output So of the comparator 60 are fed to the OR gate 61, the output of which is extracted as the output signal S of the detector 90.

The circuit located at the righthand side of the drawing for the potential vn coming from the mimic sensor 21 includes: the resistor 82 that comprises the time constant circuit together with the parallel capacitor 22 of the mimic sensor 21; a transmission gate 92 for circuit isolation; a transmission gate 71 for interrupting the operation of the time constant circuit; and the transistor 50 acting as the means for applying the ground potential E or the third potential. Like the foregoing examples, the transistor 50 for setting the third potential is controlled by the reset pulse R3 and the transmission gate 71 for interrupting the time constant circuit operation is controlled by output So of the comparator 60. The isolating transmission gate 92 is opened or closed by a control signal R5.

Next, the operation of the circuit of this embodiment will be described with reference to the waveform charts of FIG. 6. In this embodiment, prior to the detection of the light intensity, the potential vn coming from the mimic sensor 21 has to be set at the offset-compensated second potential. Before the instant for starting the operations of the circuit, as shown at (a) in FIG. 6, the control signal R5, the set command R2 and the start command R4 are set in the state "H," as shown at (b) to (d) in FIG. 6. As a result, the transmission gates 42 and 91 are turned on but the transmission gate 31 is turned off, so that the potential vp coming from the optical sensor 11 to the positive input of the comparator 60 is fixed at the second potential V2, as shown at (e) in FIG. 6.

Figure 6:
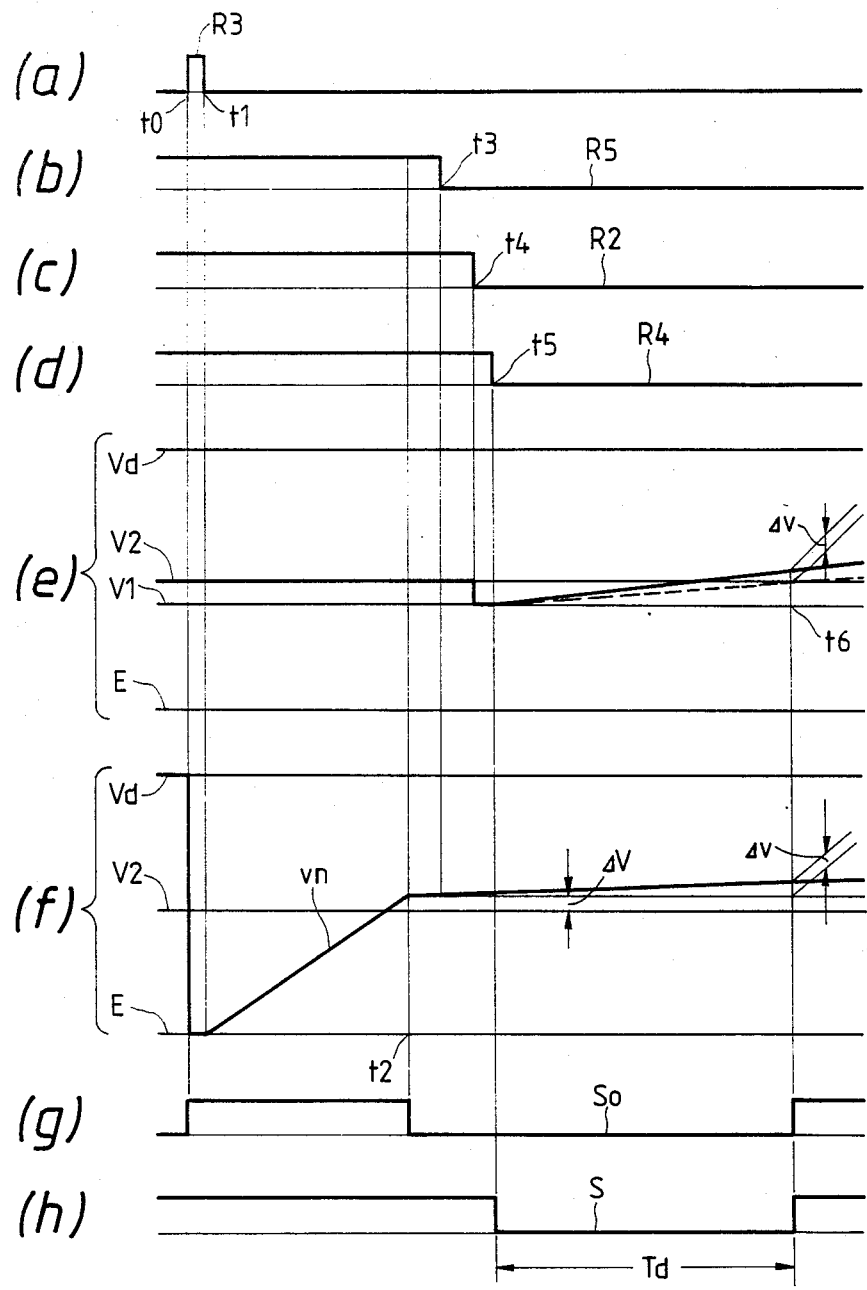
FIG. 6 is a waveform chart showing the operation of the light intensity detecting circuit of FIG. 5 according to the present invention.

In this state, as shown at (a) in FIG. 6, the potential vn from the mimic sensor 21 is usually set or initially set at the ground potential E or the third potential, as shown at (f) in FIG. 6, by feeding the third potential setting reset pulse R3 to the transistor 50 at the instant t0. As a result, the output So of the comparator 60 takes the level "H" to turn on the transmission gate 71. Since, moreover, the transmission gate 92 located above the gate 71 is also turned on by the control signal R5, the time constant circuit, which is composed of the resistor 82 and the parallel capacitor 22 of the mimic sensor 21, starts operation at an instant t1, as shown at (a) in FIG. 6.

By the timing constant operation, the potential vn coming from the mimic sensor 21 is raised, as shown at (f) in FIG. 6, until its value exceeds the second potential V2, in this embodiment, by the offset $\Delta V$ of the comparator 60. At this instant t2, the state of the output So of the comparator 60 changes from "H" to "L." As a result, the transmission gate 71 acting as the interruption means is turned off so that the operation of the time constant circuit is instantly interrupted. Then, the potential vn coming from the mimic sensor to the negative input of the comparator 60 is set at the second potential V2, which is compensated by the offset $\Delta V$ of the comparator 60.

In accordance with the state change of the output of the comparator 60, moreover, the control signal R5 is switched from "H" to "L" at an instant t3 in this embodiment, as shown at (b) in FIG. 6, to turn off the transmission gate 92. This switching is performed to prevent the operation of the time constant circuit from being reopened, when the state of the output So of the comparator 60 is later changed again to "H." Therefore, the switching of the control signal R5 need not be accomplished at this instant but may be sufficiently accomplished before a later-described instant t6. In order to enter the detection of light intensity, the set command R2 is switched from "H" to "L" at an instant t4, as shown at (c) in FIG. 6, to turn off the transmission gate 42 for the second potential V2 and to turn on the transmission gate 31 for the first potential V1 to set the potential vp of the second terminal of the optical sensor 11 at the first potential V1, as shown at (e) in FIG. 6.

The instant t4 for switching the set command R2 may on principle fall immediately after the preceding instant t2 at which the comparator 60 changed the state of its output So. Since the offset values of the comparator 60 are more or less different for the individual detectors 90 disposed for the respective optical sensors contained in the image sensor 10, as shown in FIG. 5, a dispersion arises for each detector at the instant t2. Therefore, the switching of the set command R2 is delayed a short time period from the instant t4 to the instant t2 so that the set command may be shared among the plural detectors 90.

The detecting operation of this embodiment is started by switching the detection command R4 from "H" to "L" at an instant t5 shortly after the instant t4. As a result, the potential vp at the second terminal of the optical sensor 11 is released from the first potential V1 so that it rises, as shown at (e) in FIG. 6, with a gradient determined by the sum of the photocurrent corresponding to the intensity of light received by the optical sensor 11 and the dark current. On the other hand, the potential vn at the second terminal of the mimic sensor 21 is set by the second potential V2, which is offset-compensated at the instant t2, and then gradually rises, as shown at (f) in FIG. 6, with a gentle gradient corresponding to the current value at that time. As a result, at the instant t6 when the potential vp applied to the positive input of the comparator 60 reaches a value that exceeds the second potential V2 by the augment ΔV of the potential vn based upon the dark current of the mimic sensor 21, the comparator 60 has its output So changed from the state "L" to the state "H," as shown at (g) in FIG. 6.

If the dark currents of the optical sensor and the mimic sensor are equal, as has been described before, the instant t6 coincides with the instant corresponding to the point, at which the broken line for the potential vp shown at (e) of FIG. 6, which rises solely on the basis of the photocurrent generated by the optical sensor, intersects the second potential V2. The set values of the individual potentials in the actual operation of the detector 90 may be exemplified by 5.0 V for the fixed potential Vd, 2.0 V for the second potential V2, 1.8 V for the first potential V1 and 0V or ground for the third potential E. As a result, the voltages to be applied to the optical sensor 11 and the mimic sensor 21 during the detecting operation are 3.0 to 3.2 V and about 3.0 V, respectively. Thus, it can be said that the dark currents of the two sensors are substantially equal.

The output signal S of the light intensity detecting circuit in this embodiment is extracted from the OR gate 61 which receives the output So of the comparator 60 and the detection command R4 and is a signal which will take the state "L" for the time period from the detection start instant t5 to the detection end instant t6, at which time the output So of the comparator 60 changes its state, as shown at (h) in FIG. 6. As will be understood from the above description, the shown detection time period Td, for which the state is at "L," is not influenced by the dark current of the optical sensor and accurately expresses the intensity of light as compensated for the offset of the comparator and as received by the optical sensor 11.

The present invention is not be limited to the embodiments described above but can be practiced in various modes. For example, the connection modes of the potential applying means such as the transistors or transmission gates for setting or fixing the second terminals of the optical sensors or the mimic sensors at the desired potentials, the waveforms of the reset pulses or commands for opening or closing those elements, and the timings for applying the pulses or commands to the potential applying means should be suitably selected in accordance with the purpose of detecting the light intensity and the detection accuracy demanded for the application and can be constructed or realized in various forms.

According to the present invention, a light intensity detecting circuit using a charge storage type of optical sensor having a parallel capacitor is improved by having detection results freed from the influence of the dark current of the optical sensor and from the influence of the offset of the comparator included in the detecting circuit so that the detection accuracy of the light intensity is improved over that of the prior art.

In order to eliminate the influence of the dark currents of the optical sensors in an image sensor, more specifically, there is provided a circuit for detecting the intensity of light received by an optical sensor of the charge storage type equipped with a parallel capacitor, comprising a mimic sensor constructed as a shielded optical sensor having the same structure as that of the optical sensor including a capacitor and having a first terminal fixed at a potential shared with the first end of the optical sensor. Means are provided for applying a first potential to the second terminal of the optical sensor and for applying a second potential different from the first potential to the second terminal of the mimic sensor substantially simultaneously with the application of the first potential. A comparator compares the potential at the second terminal of the optical sensor with the potential at the second terminal of the mimic sensor, whereby a signal, which indicates the time period from the instant when the second terminals of the optical sensor and the mimic sensor are set at the first and second potentials, respectively, to the instant when the potential at the second terminal of the optical sensor becomes equal to the potential at the second terminal of the mimic sensor, is extracted as an output signal indicating the intensity of light received by the optical sensor from the comparator. As a result, the potential at the second terminal of the mimic sensor is varied with time by a current equal to the dark current of the optical sensor so that the influence of the dark current component expressed as the time change of the potential at the second terminal of the optical sensor is substantially completely eliminated. As a result, the time period expressed by the output signal of the detector extracted from the comparator is the detection time period based upon the photocurrent of the optical sensor only. Thus, it is possible to accurately express the intensity of light received by the optical sensor.

In case a plurality of optical sensors are disposed in a sensor array such as an image sensor, the mimic sensor of the above-specified structure can be commonly shared among the plural optical sensors. The first potential is used to set the operating initial value of the light intensity detecting circuit, and the second potential is a so-called "comparative reference potential" in the operation of the comparator. The difference between the first and second potentials is set so that a desired light intensity detection sensitivity may be obtained by the detecting circuit. A smaller difference between these first and second potentials affords higher detection sensitivity. Another advantage is obtained for eliminating the error based upon the dark current, by setting the difference between the first and second potentials at a level sufficiently smaller than the difference between the common potential connected with the first terminals of the optical sensor and the mimic sensor and the first or second potential.

Next, in order to eliminate the influence of the offset due to the comparator included in the detection circuit, there is provided a light intensity detecting circuit comprising a time constant circuit having a first terminal fixed at a potential shared with one terminal of an optical sensor. Means are provided for applying a first potential to the second terminal of the optical sensor, and a second potential different from the first potential to the second terminal of the optical sensor and a third potential different from the second potential to the second terminal of the time constant circuit. A comparator compares the potential at the second terminal of the optical sensor with the potential at the terminal of the time constant circuit, and interruption means interrupts the time constant operation of the time constant circuit, whereby the operation of the time constant circuit is interrupted by the interruption means on the basis of the output of the comparator when the second terminal of the time constant circuit takes a potential substantially equal to that at the second terminal of the optical sensor after the second terminal of the optical sensor has been fixed at the second potential and after the second terminal of the time constant circuit is set at a third potential. As a result, the value of the second potential compensated with the offset value of the comparator is stored or latched as the potential of the second terminal of the time constant circuit so that the intensity of light received by the optical sensor is detected by using the offset-compensated second potential as the comparative reference potential. For this light intensity detection, a signal indicating the time period from the instant when the second terminal of the optical sensor is set at the first potential and when the potential at the second terminal of the time constant circuit is set at the first potential to the instant when the potential at the second terminal of the optical sensor becomes equal to the potential at the second terminal of the time constant circuit, is extracted as the output signal of the detecting circuit on the basis of the output of the comparator. Since the comparative reference potential of the comparator has already been at the offset-compensated second potential, the comparator can end the detecting operations irrespective of the offset value when the potential at the second terminal of the optical sensor reaches the second potential. As a result, the time period expressed by the output signal of the detecting circuit can be used as the detection time period, which is received by the optical sensor and expresses the light intensity accurately, without being influenced by the offset value of the comparator.

The time constant circuit mentioned above is most simply constructed by a parallel circuit of a capacitor and a resistor and operates best if the operations thereof are interrupted by isolating the resistor by the interruption means. As described in connection with the embodiment combining the principles of the first and second examples of the present invention, the capacitor of the time constant circuit can be replaced by a mimic sensor including a parallel capacitor, so that not only the offset of the comparator but also the influence of the dark current of the optical sensor can be compensated. As described above, the first potential is used to initially set the detecting operation of the detecting circuit, and the second potential is used to set the comparative reference potential of the comparator. On the other hand, the third potential is used to initially set the operations of the time constant circuit for setting the comparative reference potential which is offset and compensated by the comparator. The third potential may be different from the level of the second potential but may be equal to the level of the first potential.

The light intensity detecting circuit according to the present invention having the features explained above is suitable for establishing a set of accurate analog data or multi-bit digital data for expressing the video image of an object received by an image sensor. The detecting circuit is applied to the individual optical sensors built in the image sensor. In the case video data is prepared with the use of the prior art optical sensors, a detection accuracy providing data of 1 to 2 bits at best is obtained. The present invention can improve the accuracy to such a high level as to provide data of 8 to 16 bits. Thus, it is possible to accurately recognize or specify the pattern of a video image with the present invention. Further, the present invention can be practiced with various detection accuracy levels conforming to the requirements of a wide range of applications and objects.

What is claimed is:

1. A received light intensity detecting circuit with an optical sensor having first and second terminals and a parallel capacitor and being connected at the first terminal with a predetermined potential, first potential applying means connected between the second terminal of the optical sensor and a source of a first potential and rendered conductive at an initial setting, and a comparator having a first input terminal connected to the second terminal of the optical sensor and a second input terminal receiving a comparative reference potential of a level between the predetermined potential and the first potential such that the intensity of received light is detected as the time period between the initial setting and the instant when an output signal is generated from the comparator, comprising:

an optically shielded mimic sensor having a first terminal connected to the predetermined potential and a second terminal connected to the second input terminal of the comparator and having the same structure as that of the optical sensor including a corresponding parallel capacitor;

a source of a second potential having a level between the predetermined potential and the first potential; and second potential applying means connected between said second potential source and the second terminal of said mimic sensor and being rendered conductive only at said initial setting.

2. A received light intensity detecting circuit according to claim 1, wherein said optical lsensor is a photodiode, and wherein the parallel capacitor of said optical sensor is a junction capacitor of said photodiode.

3. A received light intensity detecting circuit with an optical sensor having first and second terminals and a parallel capacitor and being connected at the first terminal with a predetermined potential, first potential applying means connected between the second terminal of the optical sensor and a source of a first potential and rendered conductive at an initial setting, and a comparator having a first input terminal connected to the second terminal of the optical sensor and a second input terminal receiving a comparative reference potential of a level between the predetermined potential and the first potential such that the intensity of received light is detected as the time period between the initial setting and the instant when an output signal is generated from the comparator, comprising:
- a time constant circuit including a capacitor having a first terminal connected to the predetermined potential and a second terminal connected to the second input terminal of the comparator;
- second potential applying means for applying a second potential of a level between the predetermined potential and the first potential to the first input terminal of the comparator prior to the initial setting;
- third potential applying means for operating said time constant circuit for raising the second terminal of the capacitor of said time constant circuit to a third potential having a level between said predetermined potential and said second potential while said second potential is being applied by said second potential applying means to said first input terminal of said comparator; and
- interruption means for interrupting the operation of said time constant circuit in response to the generation of the output signal of the comparator.

4. A received light intensity detecting circuit according to claim 3, wherein said optical sensor is a photodiode, and wherein the parallel capacitor of said optical sensor is a junction capacitor of said photodiode.

5. A received light intensity detecting circuit with an optical sensor having first and second terminals and a parallel capacitor and being connected at the first terminal with a predetermined potential, first potential applying means connected between the second terminal of the optical sensor and a source of a first potential and rendered conductive at an initial setting, and a comparator having a first input terminal connected to the second terminal of the optical sensor and a second input terminal receiving a comparative reference potential of a level between the predetermined potential and the first potential such that the intensity of received light is detected as the time period between the initial setting and the instant when an output signal is generated from the comparator, comprising:
- an optically shielded mimic sensor having a first terminal connected to the predetermined potential and a second terminal connected to the second input terminal of the comparator and having the same structure as that of the optical sensor including a corresponding parallel capacitor;
- a time constant circuit including the parallel capacitor of said mimic sensor corresponding to the parallel capacitor of the optical sensor;
- second potential applying means for applying a second potential of a level between the predetermined potential and the first potential to the first input terminal of the comparator prior to the initial setting;
- third potential applying means for operating said time constant circuit for raising the second sensor input terminal of said mimic sensor to a third potential having a level between the predetermined potential and said second potential while said second potential is being applied by said second potential applying means to said first input terminal of said comparator; and
- interruption means for interrupting the operation of said time constant circuit in response to the generation of the output signal of the comparator.

6. A received light intensity detecting circuit according to claim 5, wherein said optical sensor is a photodiode, and wherein the parallel capacitor of said optical sensor is a junction capacitor of said photodiode.

* * * * *